B. F. ASH.
ELECTRIC RAT TRAP.
APPLICATION FILED AUG. 28, 1912.

1,056,620.

Patented Mar. 18, 1913.

WITNESSES
Samuel Payne
Horace T. Seitz

INVENTOR
B. F. Ash.
by
ATTORNEYS

UNITED STATES PATENT OFFICE.

BENJAMIN F. ASH, OF VALLEY STATION, KENTUCKY.

ELECTRIC RAT-TRAP.

1,056,620.    Specification of Letters Patent.    Patented Mar. 18, 1913.

Application filed August 28, 1912. Serial No. 717,564.

*To all whom it may concern:*

Be it known that I, BENJAMIN F. ASH, a citizen of the United States of America, residing at Valley Station, in the county of Jefferson and State of Kentucky, have invented certain new and useful Improvements in Electric Rat-Traps, of which the following is a specification, reference being had therein to the accompanying drawing.

My invention relates to improvements in electric rat traps, and has for its objects the provision of simple and efficient means for catching and electrocuting rodents, and to provide a construction which is durable and which can be manufactured and installed at a relatively low cost.

To these and other ends, the nature of which will be readily understood as the invention is hereinafter disclosed, said invention consists in the improved construction and combination of parts, hereinafter fully described, illustrated in the accompanying drawings, and particularly pointed out in the appended claims.

Figure 1:
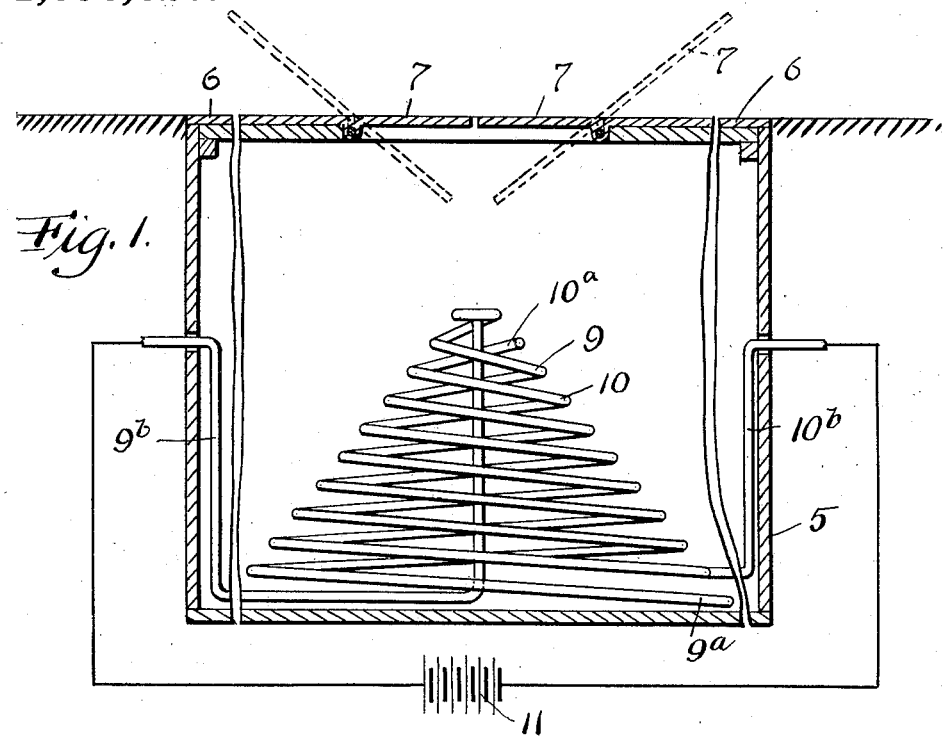
Figure 2:
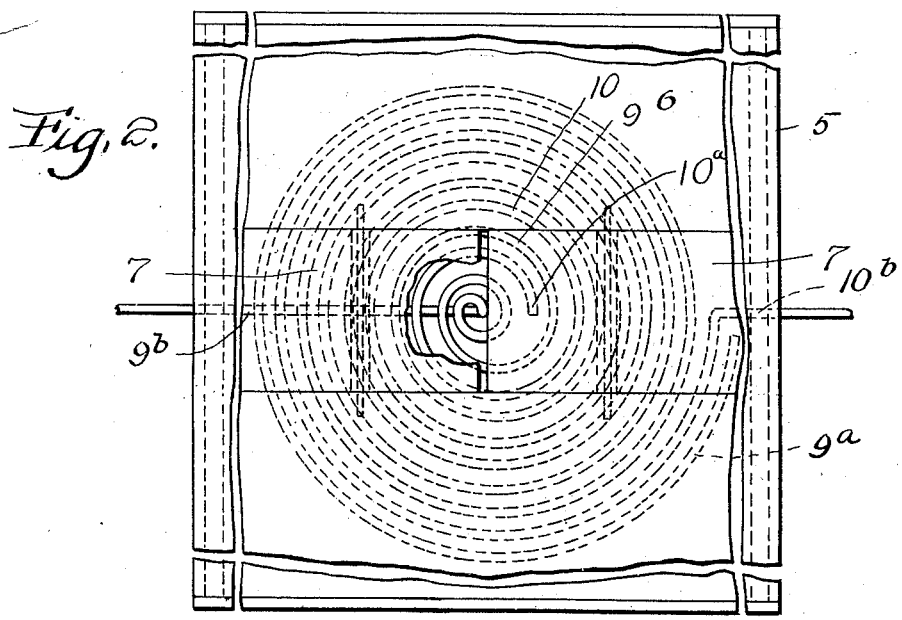

In the accompanying drawings, in which similar reference characters indicate corresponding parts in each of the views—Figure 1 is a vertical cross-sectional view of a trap constructed in accordance with my invention, showing the electrocution structure in position therein. Fig. 2 is a top plan view of the same, parts thereof being broken away for clearness.

The present invention comprises a casing of suitable construction, as for instance a box indicated at 5, said box having a top 6. The box is preferably formed of an insulating material, such for instance, as wood, and is preferably located so as to place the top 6 on the plane of a floor or other surface over which the rodents are adapted to travel, being positioned in any desirable manner. The top 6 is preferably provided with one or more trap-doors 7, pivotally mounted so as to normally remain in the plane of the top 6, but which will, when the rodent passes thereover, open so as to deposit the rodent within the interior of the casing, any preferred form of trap-door being employed for this purpose. As will be seen in Fig. 2, the normal position of the trap-door or doors is such that the top plane of the box appears to be substantially solid and uniform, offering no indication of the presence of a trap, and as the trap-doors are located in approximately the path over which the rodents generally travel, it will be readily understood that the suspicions of the rodent are not raised by the exposed portion of the trap.

The electrocuting feature of the trap comprises two helical members in the form of cones, said members being spaced apart and having a common axis. In the drawings, the two members are shown respectively at 9 and 10, the member 9 having its free end $9^a$ at the bottom of the convolutions, while the member 10 has its free end $10^a$ located adjacent the top of the convolutions, the members being in the form of wire which may be of spring metal or other structure of sufficient strength to withstand the usage to which it may be applied. The members 9 and 10 are connected to or form continuations of lead wires $9^b$ and $10^b$ which extend through the walls of the casing and are connected in circuit with a suitable source of electrical supply indicated at 11. As will be seen in Fig. 1, the convolutions of the members 9 and 10 are preferably arranged so as to provide uniform planes tapering from the bottom of the casing toward the top of the convolutions, the several convolutions, however, being spaced from each other so as to prevent short circuiting through the members. The lead wire $9^b$ preferably extends inward to and practically is located on the axis of the coils, the member 9 leading from the upper end of this lead wire.

By reason of the particular form and arrangement of the two terminals or electrodes provided by the members 9 and 10, it will be readily understood that the same provides the appearance of a construction which would permit the rodent to crawl up to the apex of the structure in position where escape might be had; a spacing between the meeting ends of opposing doors, such as shown in Fig. 1, aiding in this deception, since such opening is apparently the only means of exit. Obviously, whenever any of the convolutions of the member 9 become bridged with those of the member 10 through the body of the rodent, the electrocuting circuit is completed, and as a plurality of convolutions are employed, it will be readily understood that the electrocution may take place without regard to the size of the rodent which may be within the casing.

The casing may be of any suitable size preferably larger than the space required for the members 9 and 10 in case that the rodent is thrown to one side of said members 9 and 10. After electrocution if a rodent falls upon the electrocuting device, in most all cases his legs will enter the spaces between the convolutions which will act to hold the rat so that he will be electrocuted.

While I have herein shown and described one way in which my invention may be carried into effect, it will be readily understood that changes and modifications therein may be required or desired in use, and I desire it to be understood as reserving the right to make any and all such changes or modifications as may be required or desired, in so far as the same may fall within the spirit and scope of the invention as expressed in the accompanying claims.

Having thus described my invention, what I claim as new is:—

1. In an electric rat trap, a casing having a trap-door structure for depositing the rodent within the casing, a skeleton electrocuting device within the casing, said device comprising conical spiral members having a common axis, the convolutions of one member alternating with and spaced from those of another member, adjacent convolutions being connected to opposite sides of a source of electrical energy.

2. In an electric rat trap, a casing having a trap-door structure for depositing the rodent within the casing, and an electrocuting device within the casing, said device comprising conical spiral members having a common axis, the convolutions of one member alternating with and spaced from those of another member, adjacent convolutions being connected to opposite sides of a source of electrical energy, said members having a conical appearance and combinedly producing, when assembled, a skeleton device widest at its base and tapering toward its top.

3. In an electric rat trap, a casing having a trap-door structure for depositing the rodent within the casing, and an electrocuting device within the casing, said device comprising conical spiral members having a common axis, the convolutions of one member alternating with and spaced from those of another member, adjacent convolutions being connected to opposite sides of a source of electrical energy, said members having a conical appearance and combinedly producing, when assembled, a skeleton device widest at its base and tapering toward its top, the free ends of the members being located at opposite ends of the device.

In testimony whereof I affix my signature in the presence of two witnesses.

BENJAMIN F. ASH.

Witnesses:
J. W. WARD,
B. O. HERR.

Copies of this patent may be obtained for five cents each, by addressing the " Commissioner of Patents, Washington, D. C."